(«United States Patent [19]

Okuno

[11] 3,911,101
[45] *Oct. 7, 1975

[54] FUMIGANT COMPOSITION CONTAINING A CHRYSANTHEMIC ACID ESTER

[75] Inventor: Yositosi Okuno, Toyonaka, Japan

[73] Assignee: Sumitomo Chemical Company, Limited, Osaka, Japan

[ * ] Notice: The portion of the term of this patent subsequent to June 25, 1991, has been disclaimed.

[22] Filed: May 30, 1973

[21] Appl. No.: 365,278

Related U.S. Application Data

[63] Continuation-in-part of Ser. No. 86,840, Nov. 4, 1970, Pat. No. 3,819,823.

[30] Foreign Application Priority Data

Nov. 14, 1969 Japan.............................. 44-91617

[52] U.S. Cl. .................... 424/40; 424/16; 424/27; 424/306
[51] Int. Cl.$^2$................... A01N 17/04; A01N 9/24
[58] Field of Search ............ 424/40, 27, 18, 16, 306

[56] References Cited
UNITED STATES PATENTS 2,607,796  8/1952  Schechter et al. ............ 424/306 X
3,266,984  8/1966  Ueda et al. .................... 424/306 X

OTHER PUBLICATIONS

Yamamoto – "Noyakhgaku (Agricult. Chem.)" Pub. by Nanko –Do, p. 73 (1963).

Gersdorff et al. – J. Econ. Entom. 46 999–1003 (1953).

Primary Examiner—Albert T. Meyers
Assistant Examiner—Leonard Schenkman
Attorney, Agent, or Firm—Stevens, Davis, Miller & Mosher

[57] ABSTRACT

An insecticidal composition in the form of fumigant which comprises, as an active ingredient, dl-2-allyl-3-methyl-cyclopent-2-ene-1-one-4-yl d-trans-chrysanthemate consisting of dl-allethrolone and d-trans-chrysanthemic acid, and an inert carrier, which has a rapid knock down effect and an effect to delay the recovery of injurious insects knocked down, and which is useful for sanitary, agricultural and horicultural purposes.

2 Claims, No Drawings

FUMIGANT COMPOSITION CONTAINING A CHRYSANTHEMIC ACID ESTER

This application is a continuation-in-part of Application Ser. No. 86,840, filed Nov. 4, 1970 now U.S. Pat. No. 3,819,823.

This invention relates to a novel insecticidal composition in the form of fumigant which contains as an active ingredient dl-2-allyl-3-methyl-cyclopent-2-ene-1-one-4-yl d-trans-chrysanthemate.

The object of the present invention is to provide a novel insecticidal composition in the form of fumigant which has a rapid knock down effect and an effect to delay the recovery of injurious insects knocked down, and which is useful for sanitary, agricultural and horticultural purposes.

In the present invention, the effect to delay the recovery of injurious insects knocked down is hereinafter referred to as the persistent effect, and the fumigant means such composition as produce the vapor of the active ingredient by means of heating or fogging.

As insecticides for environment sanitation, oil sprays, aerosols, emulsifiable concentrates and dusts of pyrethrin and allethrin have widely been used heretofore because of their low toxicity to mammals and a rapid knock down effect.

In order to obtain an insecticide having more effective insecticidal activity with low toxicity to mammals, compared with that of the conventional insecticides, the present inventor has extensively studied and attained to the knowledge that an ester consisting of dl-alllethrolone and d-trans-chrysanthemic acid (hereinafter referred to as the present ester) can display a specifically high insecticidal activity when used as the fumigant, which is entirely different in application condition from oil sprays, aerosols, etc. Such knowledge cannot easily be inferred theoretically as well as from the knowledge on the insecticidal activity of said ester in the form of an oil spray or the like.

The inventor has found that when used the present ester in the form of an electric mosquito killer mat or an insect fogger, which is necessarily subjected to heating the present ester has several times the knock-down effect of the ordinary allethrin product, which is an ester consisting of dl-allethrolone and dl-cis, trans-chrysanthemic acid.

Thus, the present invention is to provide an insecticidal composition in the form of the fumigant containing as an active ingredient an effective amount of dl-2-allyl-3-methyl-cyclopent-2-ene-1-one-b 4-yl d-trans-chrysanthemate obtained by the reaction of dl-allethrolone and d-trans-chrysanthemic acid, and an inert carrier. The effective amount is within a range of 0.05 to 90 % by weight.

Various examinations have been made with respect to the relation between the allethrin isomers and the insecticidal activity, and it is well known that commercially available allethrins are mixtures of 8 isomers and, among these, an ester comprising d-allethrolone and d-trans-chyrsanthemic acid displays the highest insecticidal activity which has 3.86 times the insecticidal activity of the allethrin product, when used in the form of an oil spray (W. A. Gersdorff and Narman Mitilin: J. Econ. Entmol., 46, page 999 (1953)).

As to the preparation of d-allethrolone, however, there is no hope at all for the industrialization thereof at present, and it is also well known that in order to obtain an allethrin which is higher in insecticidal activity than that of the allethrin product available at present, there may be prepared an ester consisting of dl-allethrolone and d-trans-chrysanthemic acid. For example, Ryo Yamamoto: "Noyakugaku (Agricultural Chemicals)" (published by Nankodo on Mar. 15, 1963) describes on page 73 that the insecticidal activity on houseflies of the present ester is about 2 times the activity of the ester consisting of dl-allethrolone and dl-cis, trans-chrysanthemic acid, and recommends to use the ester of d-trans-chyrsanthemic acid in order to enhance the insecticidal activity of the allethrin product.

The present inventor also tested the insecticidal activity of the individual chemicals on housefly adults and those of oil sprays thereof on housefly adults and Northern house mosquito adults to obtain the results that the insecticidal activity of the present ester is about 2.1 to 2.4 times the activity of allethrin, which well coincided with the results stated by Ryo Yamamoto.

Until today, however, the ester using d-trans-chrysanthemic acid has not been put into practical use. This is ascribable to the fact that when used in the form of an oil spray, the ester of d-trans-chrysanthemic acid, which has not more than about 2 times the insecticidal activity of the ordinary allethrin product, is too low in the insecticidal activity, in view of the production cost thereof, to be practically used in place of the allethrin product which is commercially available at present.

The surprising is a finding that when used in the form of fumigant such as an electric mosquito killer mat or direct fogger, the present ester gives an insecticide having more rapid knock down effects which are most important for the control of injurious insects, and which can not be anticipated from the field of conventional studies on allethrin isomers. The present inventor has completed the present invention on the basis of such confirmation that when formulated into the fumigant, the present ester gives an insecticidal composition having such rapid knock down effect as about 4.2 to 5.6 times the effect of the ordinary allethrin product and that the present insecticidal composition is more advantageous in cost and more excellent in effects that that of the ordinary allethrin product.

The present ester, dl-2-allyl-3-methyl-cyclopent-2-ene-1-one-4-yl d-trans-chrysanthemate ($n_D^{28}$ 1.5029) having the formula,

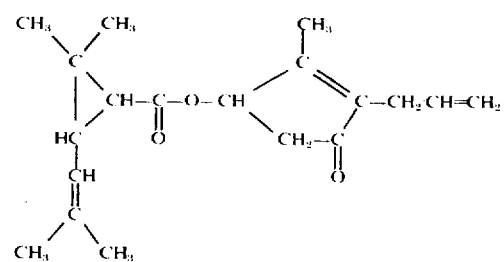

can be obtained easily in high yield by reacting, in the presence of such a dehydrochlorinating agent as pyridine, dl-allethrolone represented by the structural formula (I),

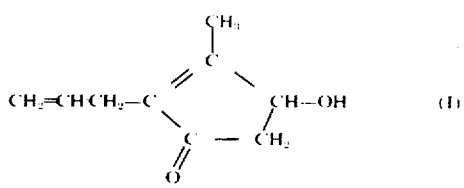

with a d-trans-chrysanthemic acid halide represented by the general formula (II),

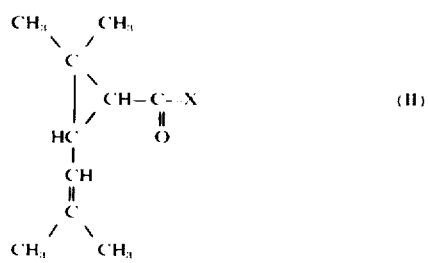

wherein X is a halogen atom.

The present insecticidal compositions which contain the present ester as an active ingredient are not only usable as domestic insecticides for the control of such sanitary injurious insects as houseflies, mosquitoes, etc. and other injurious insects in the houses, but also widely applicable to greenhouses, vinylhouses and storehouses to control stored cereal-injurious insects and agricultural and horticultural injurious insects.

In order to clarify the fact that the present invention cannot be anticipated from the conventional examinations on insecticidal activity of allethrin isomers, experimental examples and results thereof are set forth below.

Experimental Example 1

Allethrin (an ester consisting of dl-allethrolone and dl-cis,trans-chrysanthemic acid) and the present ester were individually adjusted by means of acetone to a test concentration, and tested in insecticidal effects according to a process in which the acetone solution was applied at the dorsum of prothorax of the adult fly using a special microsyringe. As the result, the 50% lethal doses ($LD_{50}$) of the individual test solutions were as shown in Table 1.

Table 1

| Test compound | $LD_{50}$ ($\gamma$/fly) | Relative effect (at $LD_{50}$) |
|---|---|---|
| Allethrin | 0.85 | 1.0 |
| Present ester | 0.355 | 2.4 |

Experimental Example 2

Allethrin (same as in Experimental Example 1) and the present ester were individually dissolved in deodorized kerosene in given concentrations, and 0.7 ml. of each of the resulting solutions was sprayed by means of an atomizer into a (70 cm)³ glass chamber. Into the glass c chamber had previously been liberated 20 adults per group of Northern house mosquitoes which had elapsed 2 to 3 days after emergence or of houseflies which had elapsed 3 to 5 days after emergence. After the spraying, the knock-down state of the insects was observed at intervals of definite period of time. As the result, the 50% knock-down times ($KT_{50}$) were as shown in Tables 2 and 3.

Table 2

(Effects on Northern house mosquito adults)

| Test compound | Concentration (%) | $KT_{50}$ (sec.) | Relative effect in terms of comparison in concentration * | | | |
|---|---|---|---|---|---|---|
| | | | Concentration corresponding to 0.1 % allethrin | | Concentration corresponding to 0.2 % allethrin | |
| | | | Concentration (%) | Relative effect | Concentration (%) | Relative effect |
| Allethrin | 0.05 | 325 | | | | |
| | 0.1 | 225 | 0.1 | 1.0 | 0.2 | 1.0 |
| | 0.2 | 138 | | | | |
| Present ester | 0.05 | 210 | | | | |
| | 0.1 | 125 | 0.041 | 2.4 | 0.096 | 2.1 |
| | 0.2 | 62 | | | | |

* Refer to FIG. 1

Table 3

(Effects on housefly adults)

| Test compound | Concentration (%) | $KT_{50}$ (sec.) | Relative effect in terms of comparison in concentration ** | | | |
|---|---|---|---|---|---|---|
| | | | Concentration corresponding to 0.1 % allethrin | | Concentration corresponding to 0.2 % allethrin | |
| | | | Concentration (%) | Relative effect | Cocentration (%) | Relative effect |
| Allethrin | 0.05 | 360 | | | | |
| | 0.1 | 282 | 0.1 | 1.0 | 0.2 | 1.0 |
| | 0.2 | 140 | | | | |
| Present ester | 0.05 | 255 | | | | |
| | 0.1 | 130 | 0.042 | 2.4 | 0.097 | 2.1 |
| | 0.2 | 72 | | | | |

** Refer to FIG. 2

The results shown in the above Experimental Examples 1 and 2 well coincide with the results of examination of conventional allethrin isomers, and the insecticidal effect ratio of the present ester, either as it is or in the form of oil spray, to allethrin is not more than about 2.1 to 2.4.

In the next place, the effects of the present ester as heating fumigants are shown below with reference to Experimental Examples 3 and 4.

Experimental Example 3

A piece of filter paper having 2 × 3.5 cm in area and 0.2 cm in thickness was impregnated respectively with each 0.3 ml. of 0.05, 5, 25, 50 and 90% acetone solutions of allethrin (an ester consisting of dl-allethrolone and dl-cis,trans-chrysanthemic acid), and the present ester, whereby each heating fumigant was prepared.

There was provided a (6 ft.)³ Peet Grady chamber according to the U.S. CSMA standard, which is equipped with a metal plate in an inner part and a plate in a lower part, which can be heated continuously to 130°C by means of an electric heater. Each heating fumigant was placed respectively on said plate, which was thereafter heated by means of said electric heater.

20 Minutes after the current application, 50 Northern house mosquito adults were liberated in the chamber, and the flies knocked down were counted according to the lapse of time to calculate $KT_{50}$ value (50% knock-down time). The results are as shown in the following Table 4.

As is clear from the above Experimental Examples 1 to 4, the present ester is shorter in 50% knock-down time ($KT_{50}$), and thus is more rapid in knock-down effect, than allethrin. The present ester is incorporated in an amount of 0.05 to 50% by weight into a fiber or the like substrata, and then the resulting fumigant is placed on a hot plate heated by means of electric power or the like to a temperature of 120° to 400°C., whereby the active ingredient diffuses with the lapse of time to display a fumigant effect for a long period of time. At this time, it is preferable to employ the present composition in the form of a fumigant containing as an active ingredient 0.1 to 30% by weight of the present ester contained in a fibrous carrier such as asbestos, pulp plate or the like. Alternatively, the present ester is formulated by conventional method into an oil preparation containing 0.05 to 90% by weight of the active ingredient or an emulsion containing 1 to 50% by weight of the active ingredient, and a solution obtained by diluting the oil preparation or emulsion with water is sprayed to dash through a heated cylinder or to a heated plate whereby the solution becomes foggy in the air owing to the heat. The heating temperature of such fogging method is 100°C. to 500°C., for example, about 100°C. in the case of emulsion and about 300°C in the case of oil preparation. Still alternatively, the present ester is formulated into an oil spray of 0.05 to 90% by weight concentration, and the oil spray is ascended by capillary action through a lamp-wick or the like and then heated, whereby a fumigant effect can be displayed as well.

Table 4

| Concentration (%) Compound | 0.05 | 5 | 25 | 50 | 90 |
|---|---|---|---|---|---|
| Present ester $KT_{50}$ (min. sec.) | 74' | 12' | 5' | 2'06" | 1'24" |
| Allethrin $KT_{50}$ (min. sec.) | >120' | 52'30" | 27' | 10'24" | 5'54" |
| Relative effectiveness to allethrin | — | 4.4 | 5.4 | 5.0 | 4.2 |

Experimental Example 4

Each solution obtained by diluting each 20% emulsion of the present ester and allethrin with water by conventional method was prepared and each 3 g of the solution was fogged by means of an Insect Fogger produced by Burgess Vibrocrafters, Inc., into a Peet Grady chamber according to the U.S. CSMA standard wherein about 100 houseflies were liberated in advance and the flies knocked down were counted with the lapse of time to calculate $KT_{50}$ value (50% knock-down time). The results are as shown in the following Table 5.

Table 5

| Concentration (Dilutions) Compound | × 50 | × 100 | × 200 | Effectiveness ratio |
|---|---|---|---|---|
| Present ester $KT_{50}$ (min.) | 6' | 11' | 20' | about 4.0 |
| Allethrin $KT_{50}$ (min.) | 21' | >30' | >30' | 1.0 |

The present ester, which is an active ingredient of the present compositions, may not only be used singly but may be incorporated with, as stabilizers, suitable amounts of phenol or bisphenol derivatives such as BHT or the like, or arylamines such as phenyl-α-naphthylamine, phenyl-β-naphthylamine or condensation product of phenetidine with acetone, whereby compositions which have been more stabilized in insecticidal effects can be obtained. Further, the compositions may be increased in insecticidal activity by incorporation of synergists for pyrethroid type insecticides such as α-(2-(2-butoxyethoxy)ethoxy)-4,5-methylenedioxy-2-pyropytoluene (hereinafter referred to as "piperonyl butoxide"), N-(2-ethylhexyl)-bicyclo(2,2,1)hepta-5-ene-anhydrophthalic acid-2,3-dicarboximide (hereinafter referred to as "MGK-264") and the like.

Procedures for the preparation of the present compositions and effects thereof are illustrated below with reference to examples and test examples, but it is needless to say that the scope of the present invention is not limited to the examples.

EXAMPLE 1

A solution of 0.2 of the present ester in chloroform is uniformly adsorbed on the surface of an asbestos piece of 2.5 cm. × 1.5 cm. in area and 0.3 cm. in thickness. Onto the thus treated asbestos piece is adhered another asbestos piece same in size to obtain an insecticidal fumigant composition for use on an electrically heated plate.

As the fibrous support, there may be used, in addition to asbestos, a pulp plate or the like material equal in effect to asbestos.

EXAMPLE 2

20 Parts of the present ester, 30 parts of Sorpol SM-200 (Registered trade mark of emulsifier produced by Toho Chemical Co., Ltd.) and 40 parts of xylene are mixed well and dissolved in one another with stirring to obtain an insecticidal composition for a fogging machine.

EXAMPLE 3

5 Parts of the present ester and 10 parts of piperonyl butoxide are dissolved in 85 parts of kerosene to obtain an insecticidal composition for a fogging machine.

TEST EXAMPLE 1

Into a (70 cm)³ glass chamber were liberated about 50 adults of housefly. The insecticidal fumigant composition obtained according to Example 1 was placed on an electric heating means and placed at the center of the bottom of the chamber, and an electric current was applied to said electric heating means. Subsequently, the interior of the chamber was stirred by means of a small electric fan of 13 cm. in blade diameter, whereby more than 90% of the housefly adults could be knocked down within 20 minutes.

TEST EXAMPLE 2

Into a Peet Grady chamber according to the U.S. CSMA standard, was liberated each group of about 50 adults of German cockroach. An emulsion obtained by diluting the composition of Example 2 with 100 times the volume of the composition of water or a solution obtained by diluting the composition of Example 3 with 100 times the volume of the composition of kerosene was fogged by means of an Insect Fogger produced by Burgess Vibrocrafters, Inc. into the chamber in an amount of 3 g at each time. All the adults could be knocked down within 30minutes at each time.

What I claim is:

1. An insecticidal material consisting essentially of an effective amount of dl-2-allyl-3-methyl-cyclopent-2-ene-1-one-4-yl d-trans-chrysanthemate absorbed on a fibrous support suitable for use on an electrically heated plate.

2. A method for killing insects which comprises exposing said insects to a vapor produced by heating the material of claim 1.

* * * * *